(12) United States Patent
Vamanan et al.

(10) Patent No.: US 12,267,911 B2
(45) Date of Patent: Apr. 1, 2025

(54) DETERMINISTIC PLMN SELECTION DURING DISASTER ROAMING

(71) Applicant: APPLE INC., Cupertino, CA (US)

(72) Inventors: Sudeep Manithara Vamanan, Munich (DE); Haijing Hu, Cupertino, CA (US); Vivek G. Gupta, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 390 days.

(21) Appl. No.: 17/810,891

(22) Filed: Jul. 6, 2022

(65) Prior Publication Data

US 2023/0043617 A1     Feb. 9, 2023

Related U.S. Application Data

(60) Provisional application No. 63/203,946, filed on Aug. 5, 2021.

(51) Int. Cl.
| | |
|---|---|
| *H04W 8/12* | (2009.01) |
| *H04W 60/04* | (2009.01) |
| *H04W 84/04* | (2009.01) |

(52) U.S. Cl.
CPC .............. *H04W 8/12* (2013.01); *H04W 60/04* (2013.01); *H04W 84/042* (2013.01)

(58) Field of Classification Search
CPC ...... H04W 8/12; H04W 60/04; H04W 84/042
See application file for complete search history.

(56) References Cited

U.S. PATENT DOCUMENTS

| | | | | |
|---|---|---|---|---|
| 2021/0051466 A1* | 2/2021 | Kumar | ................. | H04W 76/27 |
| 2022/0295260 A1* | 9/2022 | Yamine | ................. | H04W 8/00 |
| 2023/0254733 A1* | 8/2023 | Park | .................. | H04W 4/90 |
| | | | | 370/229 |

FOREIGN PATENT DOCUMENTS

| | | |
|---|---|---|
| WO | 2020141956 A1 | 7/2020 |
| WO | 2021007447 A1 | 1/2021 |
| WO | 2021015597 A1 | 1/2021 |

OTHER PUBLICATIONS

LG Electronics (Rapporteur), "Discussion on the existing solutions and questions for moderation for FA-MINT-CT", C1-210952, 3GPP TSG-CT WG1 Meeting #128-e, Electronic Meeting, Agenda Item 17.2.9, Feb. 25-Mar. 5, 2021, 13 pages.

\* cited by examiner

*Primary Examiner* — Charles N Appiah
*Assistant Examiner* — Nicole M Louis-Fils
(74) *Attorney, Agent, or Firm* — Dorsey & Whitney LLP

(57) ABSTRACT

Systems and methods are provided for public land mobile network (PLMN) selection for disaster roaming. A user equipment (UE) determines a disaster condition at a first PLMN, where the UE is a subscriber of the first PLMN. The UE determines an availability of a second PLMN for disaster roaming. The UE selects the second PLMN and attempts registration on the second PLMN for disaster roaming. In response to attempting the registration on the second PLMN for disaster roaming, the UE receives a registration reject message including a cause value corresponding to a registration failure for disaster roaming on the second PLMN due to the disaster condition on the first PLMN. The UE waits for a first period of time before again attempting to register for disaster roaming on the second PLMN for the first PLMN with the disaster condition.

20 Claims, 7 Drawing Sheets

DETERMINISTIC PLMN SELECTION DURING DISASTER ROAMING

TECHNICAL FIELD

This application relates generally to wireless communication systems, including public land mobile network (PLMN) selection during disaster roaming.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
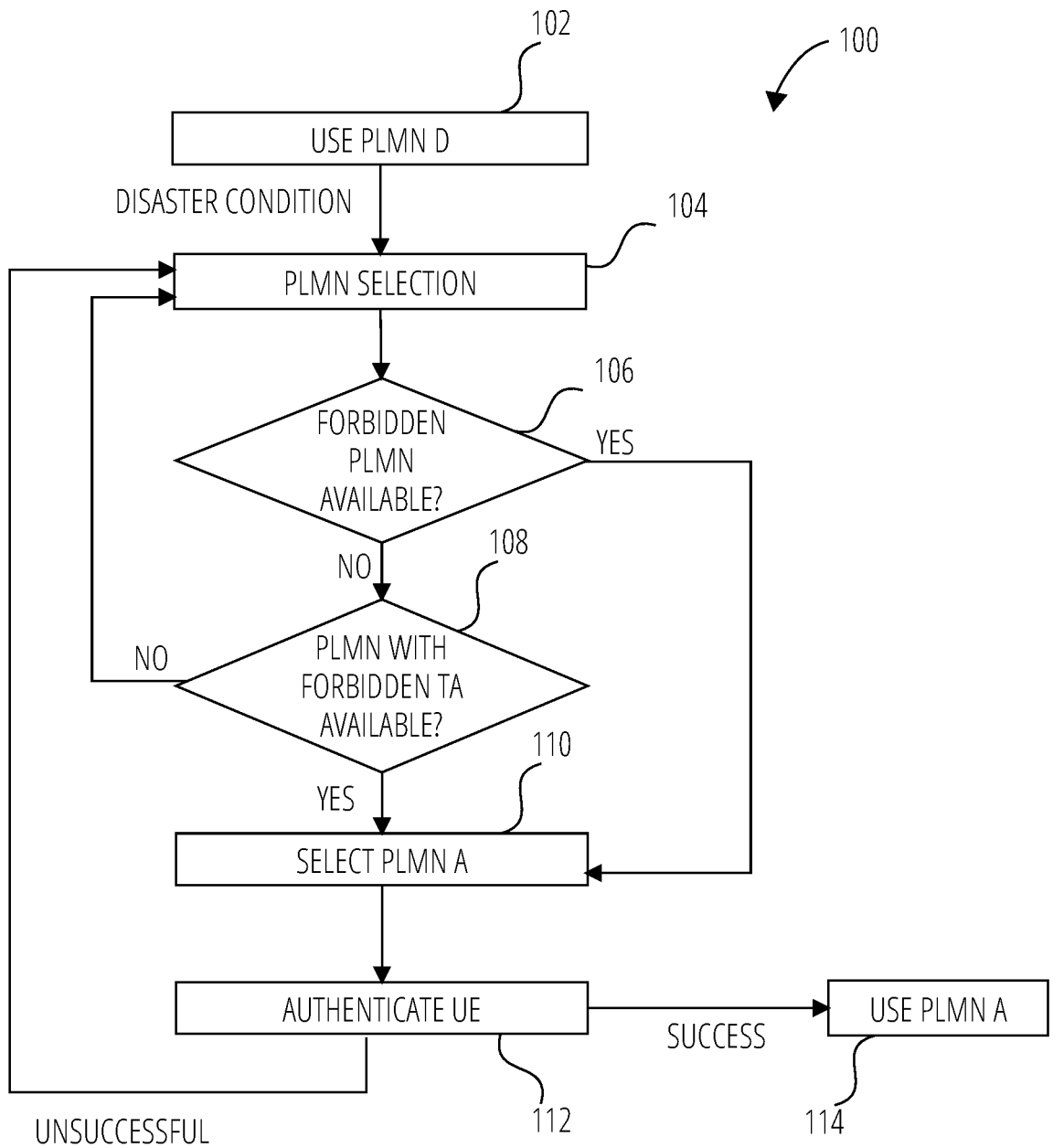
FIG. 1 illustrates a flow diagram of possible deadlock looping during UE selection of a PLMN in a disaster condition.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

As contemplated by the 3GPP, a UE may connect to a public land mobile network (PLMN) for a variety of connectivity services. In some instances, when connecting to a selected PLMN, UE registration with the selected PLMN may fail. For example, a UE may be a subscriber of PLMN D and attempt to register with PLMN D, but the registration may fail due to a disaster condition. The UE may determine a disaster condition on PLMN D, for example, when the UE does not detect any cell of PLMN D and the UE finds another PLMN indicating that it is offering disaster roaming for PLMN D.

In disaster roaming, the UE may attempt to register with an alternate PLMN by performing a PLMN search and selecting an alternate PLMN depending on defined PLMN priority information of the UE. Due to the disaster condition, the UE may select an alternate PLMN from either its forbidden PLMN list or a list of PLMNs with forbidden tracking areas (TAs). A particular PLMN may be on the UE's forbidden PLMN list or list of PLMNs with forbidden TAs, for example, if so indicated by the UE's subscribed or home PLMN (e.g., the home PLMN does not have a roaming agreement with the particular PLMN) or the UE adds the particular PLMN to the list after attempting and failing to register with the particular PLMN. The UE's forbidden PLMN list or list of PLMNs with forbidden TAs may be kept for a period of time (e.g., 12 hours or 24 hours) and then refreshed so the UE can later attempt registration.

As an example, the UE may be a subscriber of PLMN D. The UE may be unsuccessful connecting to PLMN D due to a disaster condition. Or, the PLMN D may provide notification that it is unavailable due to a disaster condition. PLMN A may be on the UE's forbidden PLMN list or list of PLMNs with forbidden TAs. However, when other PLMNs are not available, the UE may select PLMN A, which is offering disaster roaming for subscribers of PLMN D. The UE indicates to PLMN A that it is selecting PLMN A for disaster roaming due to the disaster condition on PLMN D. PLMN A may authenticate the UE by contacting the authentication server function (AUSF) and/or unified data manager function (UDM) of PLMN D. If the authentication is successful, the UE receives normal service on PLMN A. However, if the authentication is unsuccessful, PLMN A may reject the UE registration, e.g., the UE may receive a registration reject message with cause #11 (forbidden PLMN) or cause #13 (forbidden TA). Additionally, if the authentication in unsuccessful, the UE may continue searching for another PLMN. Notably, there is not a cause value defined by 3GPP to account for a minimization of service interruption (MINT) registration failure.

Various embodiments for configuring a UE to allow deterministic PLMN selection are described herein. The use of one or more of these embodiments may promote a more efficient UE registration procedure with PLMNs and reduce network load.

In the case of authentication failure, the UE PLMN selection may go into a repetitive PLMN selection loop and this could lead to network overload. An authentication failure may occur for a variety of reasons including, but not limited to, the selected PLMN (e.g., PLMN A) being temporarily overloaded with signaling, the UE wandering or moving out of the registration area, and/or the subscriber's PLMN being temporarily unreachable for authentication. As defined by the 3GPP, PLMNs that have authentication failures are placed on a forbidden PLMN list or forbidden TA list by the UE. The UE may again attempt registration with PLMN A if no other PLMNs are available. Thus, as discussed below with respect to FIG. 1, the UE may go into a PLMN selection loop that could lead to network overload. Further, the UE may be out of service for extended periods of time during the disaster condition.

FIG. 1 illustrates a flow diagram 100 of possible deadlock looping during UE selection of a PLMN in a disaster condition. In one instance of deadlock, the UE may use PLMN D at block 102. As in the examples above, the UE is a subscriber of PLMN D. The PLMN D may encounter a disaster condition and be unavailable for connection with the UE, which causes the UE to make a PLMN selection at block 104. If a forbidden PLMN is available at decision block 106 (i.e., the UE detects a cell in PLMN A that is offering disaster roaming for PLMN D), the UE makes a selection of the forbidden PLMN A at block 110. The UE then attempts registration on the PLMN A, which attempts to authenticate the UE at block 112. If the PLMN authentication is unsuccessful at block 112, the UE receives a registration reject message, returns to the PLMN selection at block 104, and attempts to select a PLMN again. As shown, the UE may continue to operate in this loop.

Alternatively, the UE may use PLMN D at block 102. The PLMN may encounter a disaster condition necessitating the UE to make a PLMN selection at block 104. If a forbidden PLMN is not available at decision block 106, the UE determines if a PLMN with a forbidden TA is available at decision block 108. If a PLMN with a forbidden TA is not available, the UE returns to the PLMN selection at block 104 and attempts to select a PLMN again. As shown, the UE may continue to operate in this loop.

Alternatively, the UE may use PLMN D at block 102. The PLMN may encounter a disaster condition necessitating the UE to make a PLMN selection at block 104. If a forbidden PLMN is not available at decision block 106, the UE determines if a PLMN with a forbidden TA is available at decision block 108. If PLMN A with a forbidden TA is available, the UE makes a selection of the forbidden PLMN A at block 110. The UE then attempts registration on the PLMN A, which attempts to authenticate the UE at block 112. If the PLMN authentication is unsuccessful at block 112, the UE receives a registration reject message, returns to the PLMN selection at block 104, and attempts to select a PLMN again. As shown, the UE may continue to operate in this loop.

If the authentication at block 112 is successful, the UE communicably connects to PLMN A at block 114.

As shown in FIG. 1, if the PLMN selection is repeatedly unsuccessful at decision block 108 or the authentication of the UE is repeatedly unsuccessful at block 112, the UE selection of a PLMN may result in deadlock looping during the PLMN selection.

According to certain embodiments, it may be advantageous for the UE to continue trying to connect to the PLMN A under certain conditions. For example, if the PLMN A still indicates it provides disaster roaming and the UE's subscribed PLMN D has encountered a disaster condition, the UE may continue trying to connect to the PLMN A. In some cases, the registration failure could be due to transient conditions and it may be preferable to continue trying to authenticate at the PLMN A. As a protective measure, the network can optionally put restrictions on the time when the UE can initiate the registration procedure on arriving in the PLMN A without a disaster condition. In some embodiments, these restrictions could be signaled, pre-configured, or computed at the UE. Whether the restrictions are signaled, pre-configured, or computed at the UE (e.g., based on signaled or pre-configured parameters) may be decided during the normative phase. The UE could attach an implementation specific timer before retrying authentication on a PLMN.

To overcome deadlock looping and/or other inefficiencies during PLMN selection, in one embodiment, the UE maintains another list (i.e., in addition to the list of forbidden PLMNs and/or the list of PLMNs with forbidden TAs) of PLMNs where registration due to disaster roaming fails. In certain embodiments, the list may be referred to as a disaster roaming failure list. The UE attaches or starts an implementation specific timer before retrying authentication on the PLMNs in the disaster roaming failure list for a disaster condition on a different PLMN (e.g., PLMN E or PLMN F). The implementation specific timer may be a few minutes to a few hours. In one example, the implementation specific timer is in a range from 3 minutes to 10 minutes that the UE waits to attempt registration on PLMNs in the disaster roaming failure list for a disaster condition on another PLMN (e.g., PLMN E or PLMN F) after a failed registration due to disaster roaming for a disaster condition on PLMN D.

In certain embodiments, an access and mobility management function (AMF) may provide a new 5G system (5GS) mobility management (5GMM) cause value when rejecting the registration request. For example, the AMF may provide a registration reject message including a cause value corresponding to a registration failure for disaster roaming on PLMN A due to a disaster condition on PLMN D. In certain such embodiments, the AMF may also provide an indication of the registration failure type to indicate if the failure is temporary (and may optionally include a wait time) or if the failure is permanent (with no wait time specified). By way of example, the indicated wait time may be in a range of 12 hours to 24 hours before the UE may attempt registration on PLMN A for disaster roaming due to a disaster condition on PLMN D. In certain embodiments, if the AMF indicates a permanent failure for PLMN A, the UE may continue to perform PLMN selection with PLMN A assigned the lowest priority.

In another embodiment, a disaster roaming registration failure counter may be used. The UE increments the disaster roaming registration failure counter for each disaster roaming registration failure and uses the disaster roaming registration failure counter to stagger registration attempts. For example, the UE may compute a series of time windows for attempting registration at the PLMN (e.g., PLMN A). The series of time windows may be regulated by an initial start time. In the case of a registration failure, the subsequent attempts to register may be subject to an additional offset time that may scale upward according to the disaster roaming registration failure counter. In other embodiments, the UE may use a hash of the international mobile subscriber identity (IMSI) and a random number (or a pseudorandom number) to generate a disaster roaming wait range. The wait range may scale upward if the disaster roaming registration failure counter is non-zero. As another example, the UE may be subject to a minimum wait time that is scaled upward according to the disaster roaming registration failure counter (if the disaster roaming registration failure counter is non-zero). As another example, the UE may increment the disaster roaming registration failure counter until a threshold has been met. If the threshold value has not been met, the UE may continue to attempt to register with the PLMN.

Figure 2:
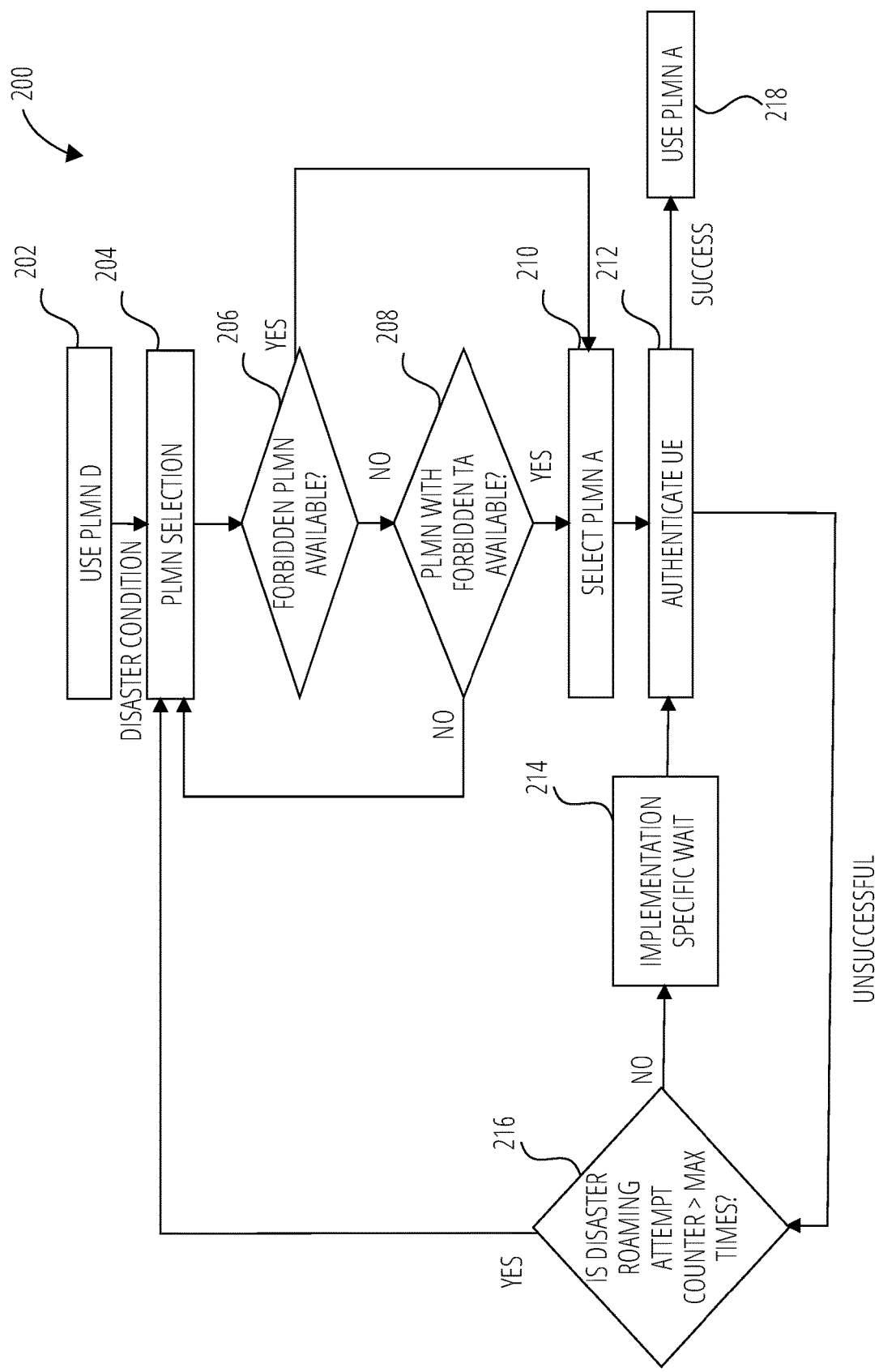
FIG. 2 illustrates a flow diagram of an implementation of a UE authorization selection using a disaster roaming attempt counter and an implementation specific timer in accordance with one embodiment.

FIG. 2 illustrates a flow diagram 200 of an implementation of a UE authorization selection using a disaster roaming attempt counter and an implementation specific timer according to one embodiment. The disaster roaming attempt counter may also be referred to herein as a disaster roaming registration failure counter.

As shown in FIG. 2, the UE may use PLMN D at block 202. The UE is a subscriber of PLMN D. The PLMN D may encounter a disaster condition and be unavailable for the UE. In response, the UE makes a PLMN selection at block 204. If a forbidden PLMN is not available at decision block 206, the UE determines if a PLMN with a forbidden TA is available at decision block 208. If a PLMN with a forbidden TA is not available, the UE returns to the PLMN selection at block 204 and attempts to select a PLMN again. If a PLMN with a forbidden TA is available, the UE makes a selection of the PLMN A at block 210. Alternatively, if a forbidden PLMN is available at decision block 206, the UE makes a selection of PLMN A at block 210. The UE then attempts registration on the PLMN A, which attempts to authenticate the UE at block 212. If the PLMN authentication is unsuccessful at block 212, the UE utilizes a disaster roaming attempt counter at decision block 216. The UE may increment the disaster roaming attempt counter for each disaster roaming registration failure as described earlier. If the disaster roaming counter has not reached the maximum count (i.e., max times), the UE may wait an implementation specific amount of time at block 214 before making another authentication request of the PLMN A at block 212. If the disaster roaming attempt counter has reached the maximum count, the UE returns to the PLMN selection at block 204 and attempts to select a PLMN again.

If the authentication at block 212 is successful, the UE uses PLMN A at block 218 for disaster roaming.

It will be understood by one skilled in the art that the steps of flow diagram 200 do not need to be performed in a specific order and may still embody the concept described when performed in another order or without utilizing a step. For example, decision block 206 and decision block 208 could be swapped. As another example, decision block 206 or decision block 208 could be removed entirely. As another example, block 204 could be replaced by another type of PLMN selection.

As shown in FIG. 2, the addition of a disaster roaming decision block 216 and implementation specific wait time block 214 may provide the UE with a solution to select a PLMN in a deterministic manner. This embodiment demonstrates one way to avoid the deadlock looping during UE selection shown in FIG. 1. This method of selection may provide more efficiency, result in less network load, and provide service that is more reliable.

Figure 3:
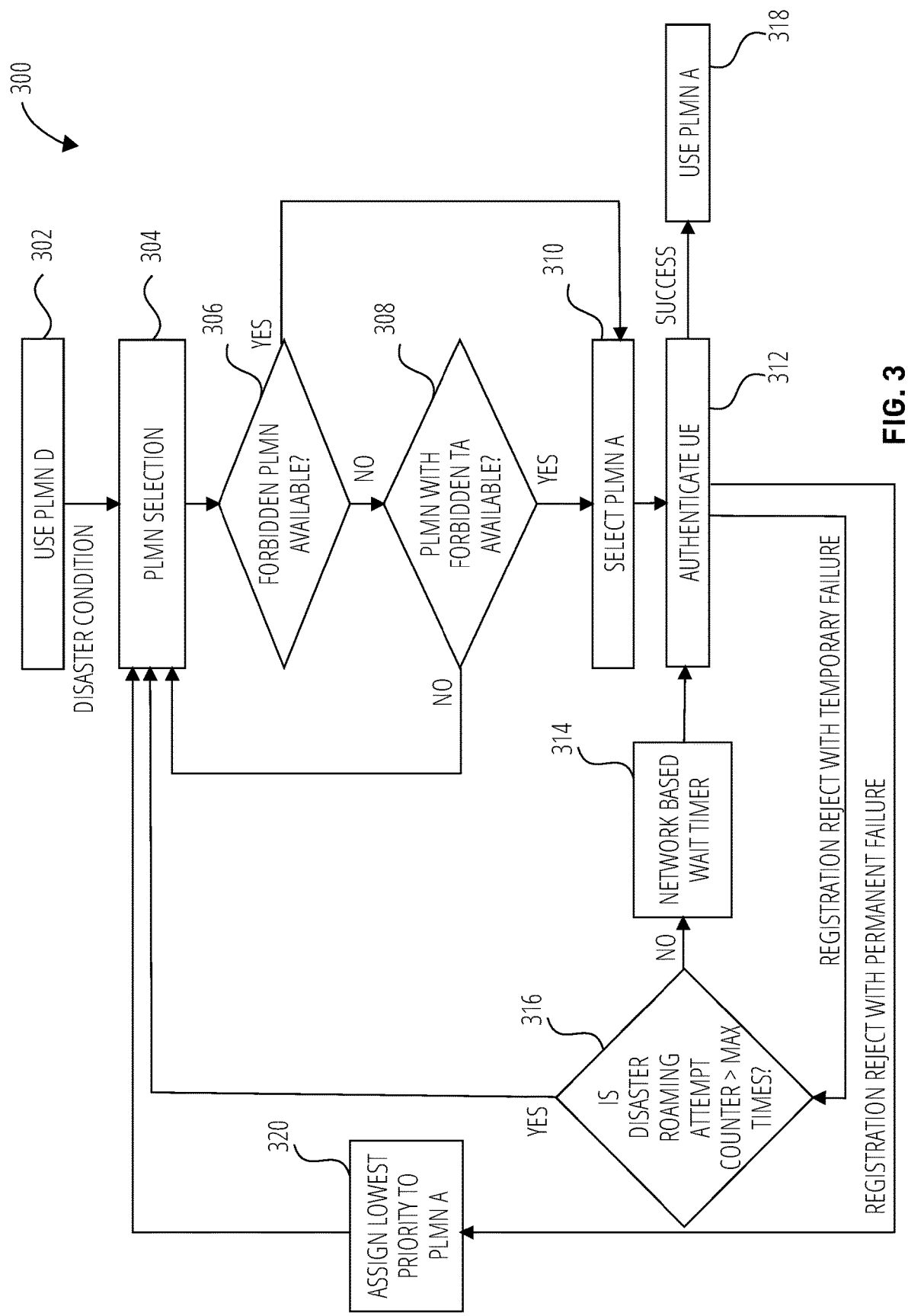
FIG. 3 illustrates a flow diagram of an implementation of a UE authorization selection using a disaster roaming attempt counter, an implementation specific timer, and a cause value in accordance with one embodiment.

FIG. 3 is a flow diagram 300 of an implementation of a UE authorization selection using disaster roaming attempt counter, an implementation specific timer, and a new 5GMM cause value corresponding to a registration failure for disaster roaming. The disaster roaming attempt counter may also be referred to herein as a disaster roaming registration failure counter.

In one embodiment, the UE may use PLMN D at block 302. As in the examples above, the UE is a subscriber of PLMN D. The PLMN may encounter a disaster condition and be unavailable for the UE. In response, the UE makes a PLMN selection at block 304. If a forbidden PLMN is not available at decision block 306, the UE determines if a PLMN with a forbidden TA is available at decision block 308. If a PLMN with a forbidden TA is not available, the UE returns to the PLMN election at block 304 and attempts to select a PLMN again at block 304. However, if a forbidden PLMN is available at decision block 306, the UE makes a selection of the PLMN A at block 310. Alternatively, if a forbidden PLMN is available at decision block 306, the UE makes a selection of PLMN A at block 310. The UE then attempts registration on the PLMN A, which attempts to authenticate the UE at block 312. The authentication may be successful or may be unsuccessful. If the authentication is unsuccessful, the UE receives (e.g., from an AMF) a registration reject message including a cause value corresponding to a registration failure for disaster roaming on PLMN A due to a disaster condition on PLMN D.

In certain embodiments, if the PLMN A authentication registration request is rejected with a temporary failure, the UE increments a disaster roaming attempt counter at decision block 316. The UE may increment the disaster roaming attempt counter for each disaster roaming registration failure as described above. If the disaster roaming attempt counter has not reached a threshold value (i.e., max times), the UE may wait for a period of time according to a network based wait time at block 314 before making another authentication request of the PLMN A at block 312. If the PLMN A authentication registration request is rejected with a temporary failure and the disaster roaming attempt counter has reached a threshold value, the UE returns to the PLMN selection at block 304 and attempts to select a PLMN again. Alternatively, if the PLMN authentication registration request is rejected with a permanent failure, the UE assigns the lowest (or a lower) priority to PLMN A at block 320 and attempts to select a PLMN again at block 304.

If the authentication at block 312 is successful, the UE uses PLMN A at block 318 for disaster roaming.

It will be understood by one skilled in the art that the steps of flow diagram 300 do not need to be performed in a specific order and may still embody the concept described when performed in another order or without utilizing a step. For example, decision block 306 and decision block 308 could be swapped. As one example, the UE decision block 316 could be removed and the UE could repetitively attempt authentication as long as the rejection is a temporary failure.

As one example, decision block 306, decision block 308, block 314, or other blocks could be removed entirely. As one example, block 304 could be replaced by another type of PLMN selection.

As shown in FIG. 3, the addition of the 5GMM cause value corresponding to the registration failure for disaster roaming on PLMN A due to a disaster condition on PLMN D when rejecting the registration request at authentication block 312 and the assignment of a lowest (or lower) priority to PLMN A at block 320 may provide the UE with a solution to take transient conditions into account when selecting a PLMN. This embodiment demonstrates one way to avoid the deadlock looping during UE selection of FIG. 1. This method of selection may provide more efficiency, result in less network load, and provide service that is more reliable.

Figure 4:
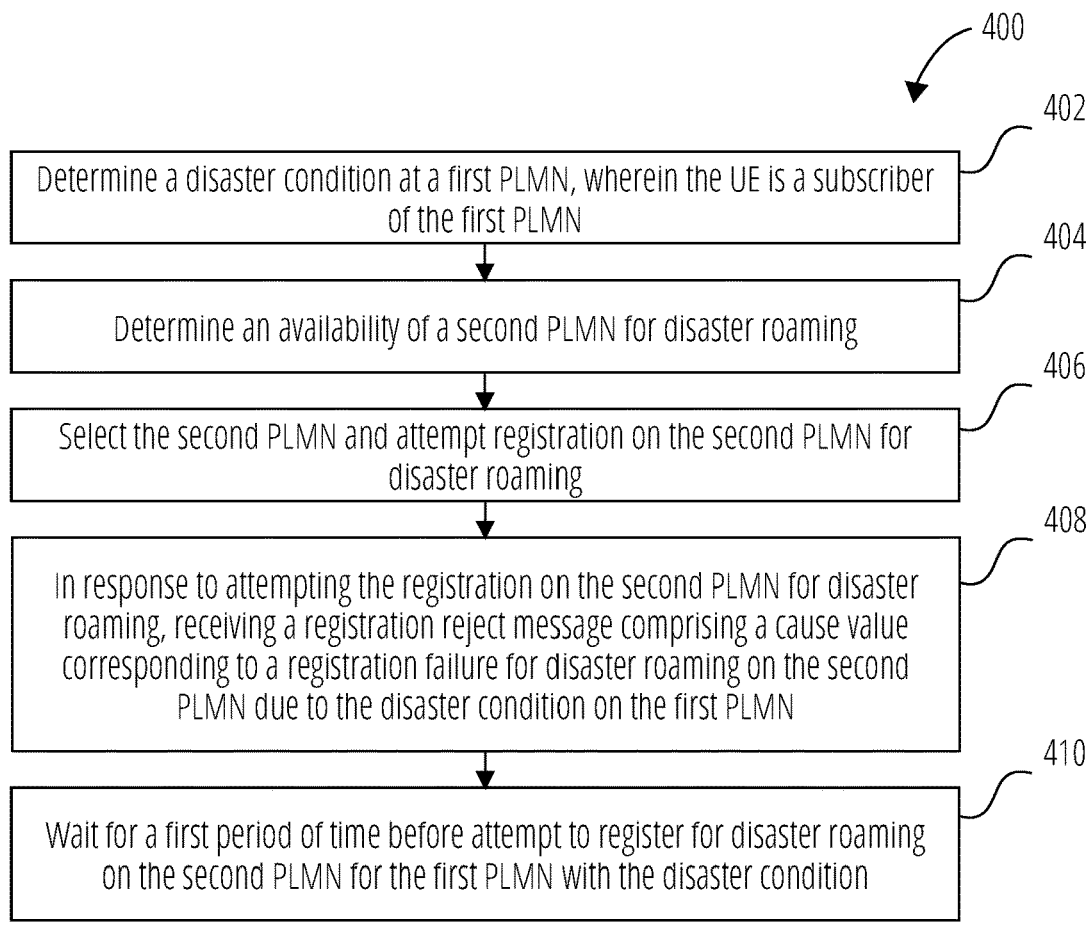
FIG. 4 illustrates a method for a UE to perform PLMN selection for disaster roaming in accordance with one embodiment.

FIG. 4 is a flowchart of a method 400 for a UE to perform PLMN selection for disaster roaming according to one embodiment. In block 402, the method 400 includes determining a disaster condition at a first PLMN, wherein the UE is a subscriber of the first PLMN. In block 404, method 400 includes determining an availability of a second PLMN for disaster roaming. In block 406, method 400 includes selecting the second PLMN and attempting registration on the second PLMN for disaster roaming. In block 408, in response to attempting the registration on the second PLMN for disaster roams, the method 400 includes receiving a registration reject message comprising a cause value corresponding to a registration failure for disaster roaming on the second PLMN due to the disaster condition on the first PLMN. In block 410, method 400 includes waiting for a first period of time before attempting to register for disaster roaming on the second PLMN for the first PLMN with the disaster condition.

In certain embodiments of the method 400, determining the availability of the second PLMN for disaster roaming includes: detecting a cell of the second PLMN that is in one of a first list of forbidden PLMNs and a second list of PLMNs with forbidden tracking areas (TAs); and receiving an indication from the cell that the second PLMN offers disaster roaming for the first PLMN.

In one embodiment, the method 400 further includes: processing an indication that the registration failure for disaster roaming on the second PLMN comprises a temporary failure; in response to the temporary failure, incrementing a disaster roaming registration failure counter; if the disaster roaming registration failure counter has not exceeded a threshold, waiting for the first period of time before attempting to register on the second PLMN for disaster roaming due to the disaster condition on the first PLMN; and if the disaster roaming registration failure counter has exceeded the threshold, attempting to register on a third PLMN for disaster roaming due to the disaster condition on the first PLMN.

In one embodiment, the method 400 further includes: processing an indication that the registration failure for disaster roaming on the second PLMN comprises a permanent or persistent failure; in response to the permanent or persistent failure, assigning a lower priority value to the second PLMN; and attempting to select a third PLMN, if available, or the second PLMN for disaster roaming based on a higher priority value for the third PLMN as compared to the lower priority value assigned to the second PLMN. In certain such embodiments, the lower priority value assigned to the second PLMN is a lowest assignable value.

In one embodiment of the method 400, the first period of time is according to a network based wait timer. The first period of time may be, for example, in a range between 12 hours and 24 hours.

In one embodiment, the method 400 further includes: in response to the registration reject message, incrementing a disaster roaming registration failure counter; if the disaster roaming registration failure counter has exceeded a threshold, attempting to register on a third PLMN for disaster roaming due to the disaster condition on the first PLMN; and if the disaster roaming registration failure counter has not exceeded the threshold, waiting for a second period of time before attempting to register on the second PLMN for disaster roaming due to another disaster condition on a fourth PLMN. In certain such embodiments, the method 400 further includes: adding the second PLMN to a PLMN list of where registration due to disaster roaming has failed; and waiting for the second period of time before attempting to register on PLMNs in the list for disaster roaming for the fourth PLMN. In other embodiments, the second period of time is according to an implementation specific wait time. For example, the second period of time may be in a range between 3 minutes and 10 minutes.

In one embodiment, the method 400 further includes: incrementing the disaster roaming registration failure counter for each disaster roaming registration failure; computing a series of time windows for attempting registration, wherein the series of time windows are regulated by an initial start time; and staggering subsequent registration attempts during the series of time windows subject to an additional offset time that is scaled upward according to the disaster roaming registration failure counter.

In one embodiment, the method 400 further includes: incrementing the disaster roaming registration failure counter for each disaster roaming registration failure; using a hash of an international mobile subscriber identity (IMSI) and a random number or a pseudorandom number to generate a disaster roaming wait range; and staggering subsequent registration attempts by scaling up the disaster roaming wait range based on a non-zero value of the disaster roaming registration failure counter.

In one embodiment, the method 400 further includes: incrementing the disaster roaming registration failure counter for each disaster roaming registration failure; and staggering subsequent registration attempts by scaling up a minimum wait time based on a non-zero value of the disaster roaming registration failure counter.

Embodiments contemplated herein include an apparatus comprising means to perform one or more elements of flow diagram 200, the flow diagram 300, and/or the method 400. This apparatus may be, for example, an apparatus of a UE (such as a wireless device 702 that is a UE, as described herein).

Embodiments contemplated herein include one or more non-transitory computer-readable media comprising instructions to cause an electronic device, upon execution of the instructions by one or more processors of the electronic device, to perform one or more elements of the flow diagram 200, the flow diagram 300, and/or the method 400. This non-transitory computer-readable media may be, for example, a memory of a UE (such as a memory 706 of a wireless device 702 that is a UE, as described herein).

Embodiments contemplated herein include an apparatus comprising logic, modules, or circuitry to perform one or more elements of the flow diagram 200, the flow diagram 300, and/or the method 400. This apparatus may be, for example, an apparatus of a UE (such as a wireless device 702 that is a UE, as described herein).

Embodiments contemplated herein include an apparatus comprising: one or more processors and one or more computer-readable media comprising instructions that, when executed by the one or more processors, cause the one or more processors to perform one or more elements of the flow diagram 200, the flow diagram 300, and/or the method 400. This apparatus may be, for example, an apparatus of a UE (such as a wireless device 702 that is a UE, as described herein).

Embodiments contemplated herein include a signal as described in or related to one or more elements of the flow diagram 200, the flow diagram 300, and/or the method 400.

Embodiments contemplated herein include a computer program or computer program product comprising instructions, wherein execution of the program by a processor is to cause the processor to carry out one or more elements of the flow diagram 200, the flow diagram 300, and/or the method 400. The processor may be a processor of a UE (such as a processor(s) 704 of a wireless device 702 that is a UE, as described herein). These instructions may be, for example, located in the processor and/or on a memory of the UE (such as a memory 706 of a wireless device 702 that is a UE, as described herein).

Figure 5:
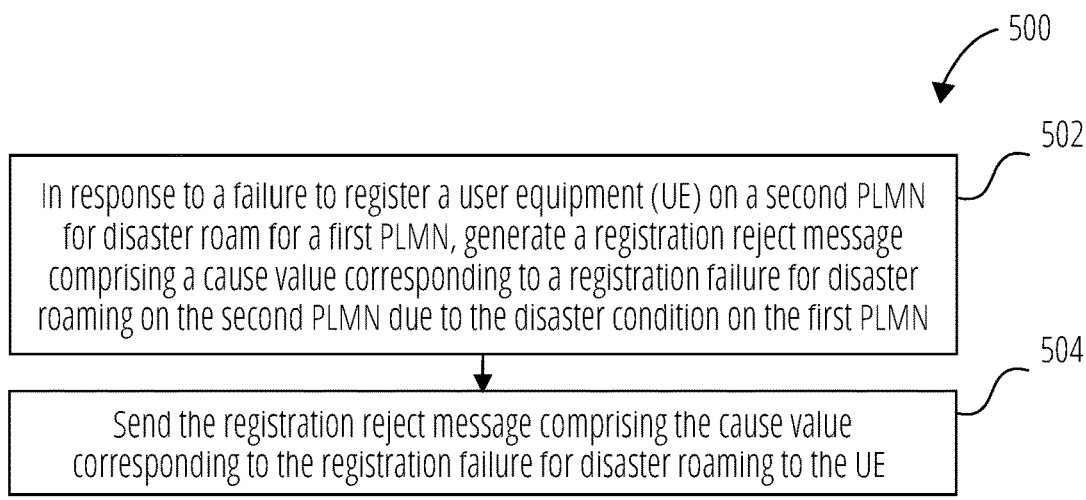
FIG. 5 illustrates a method for a network device for a disaster condition at a first PLMN in accordance with one embodiment.

FIG. 5 is a flowchart of a method 500 for a network device for a disaster condition at a first PLMN. In block 502, in response to a failure to register a UE on a second PLMN for disaster roams for the first PLMN, the method 500 includes generating a registration reject message comprising a cause value corresponding to a registration failure for disaster roaming on the second PLMN due to the disaster condition on the first PLMN. In block 504, method 500 includes sending the registration reject message comprising the cause value corresponding to the registration failure for disaster roaming to the UE.

In certain embodiments of the method 500, the network device comprises an access and mobility management function (AMF).

One embodiment of the method 500 further includes indicating, to the UE, whether the failure to register the UE on the second PLMN is a temporary failure or a permanent or persistent failure.

One embodiment of the method 500 further includes configuring the UE with a network based wait timer comprising a time period for the UE to wait before reattempting to register for disaster roaming on the second PLMN for the first PLMN with the disaster condition.

Embodiments contemplated herein include an apparatus comprising means to perform one or more elements of the flow diagram 200, the flow diagram 300, and/or the method 500. This apparatus may be, for example, an apparatus of a base station (such as a network device 718 that is a base station, as described herein).

Embodiments contemplated herein include one or more non-transitory computer-readable media comprising instructions to cause an electronic device, upon execution of the instructions by one or more processors of the electronic device, to perform one or more elements of the flow diagram 200, the flow diagram 300, and/or the method 500. This non-transitory computer-readable media may be, for example, a memory of a base station (such as a memory 722 of a network device 718 that is a base station, as described herein).

Embodiments contemplated herein include an apparatus comprising logic, modules, or circuitry to perform one or more elements of the flow diagram 200, the flow diagram 300, and/or the method 500. This apparatus may be, for example, an apparatus of a base station (such as a network device 718 that is a base station, as described herein).

Embodiments contemplated herein include an apparatus comprising: one or more processors and one or more computer-readable media comprising instructions that, when executed by the one or more processors, cause the one or more processors to perform one or more elements of the flow diagram 200, the flow diagram 300, and/or the method 500. This apparatus may be, for example, an apparatus of a base station (such as a network device 718 that is a base station, as described herein).

Embodiments contemplated herein include a signal as described in or related to one or more elements of the flow diagram 200, the flow diagram 300, and/or the method 500.

Embodiments contemplated herein include a computer program or computer program product comprising instructions, wherein execution of the program by a processing element is to cause the processing element to carry out one or more elements of the flow diagram 200, the flow diagram 300, and/or the method 500. The processor may be a processor of a base station (such as a processor(s) 720 of a network device 718 that is a base station, as described herein). These instructions may be, for example, located in the processor and/or on a memory of the base station (such as a memory 722 of a network device 718 that is a base station, as described herein).

Figure 6:
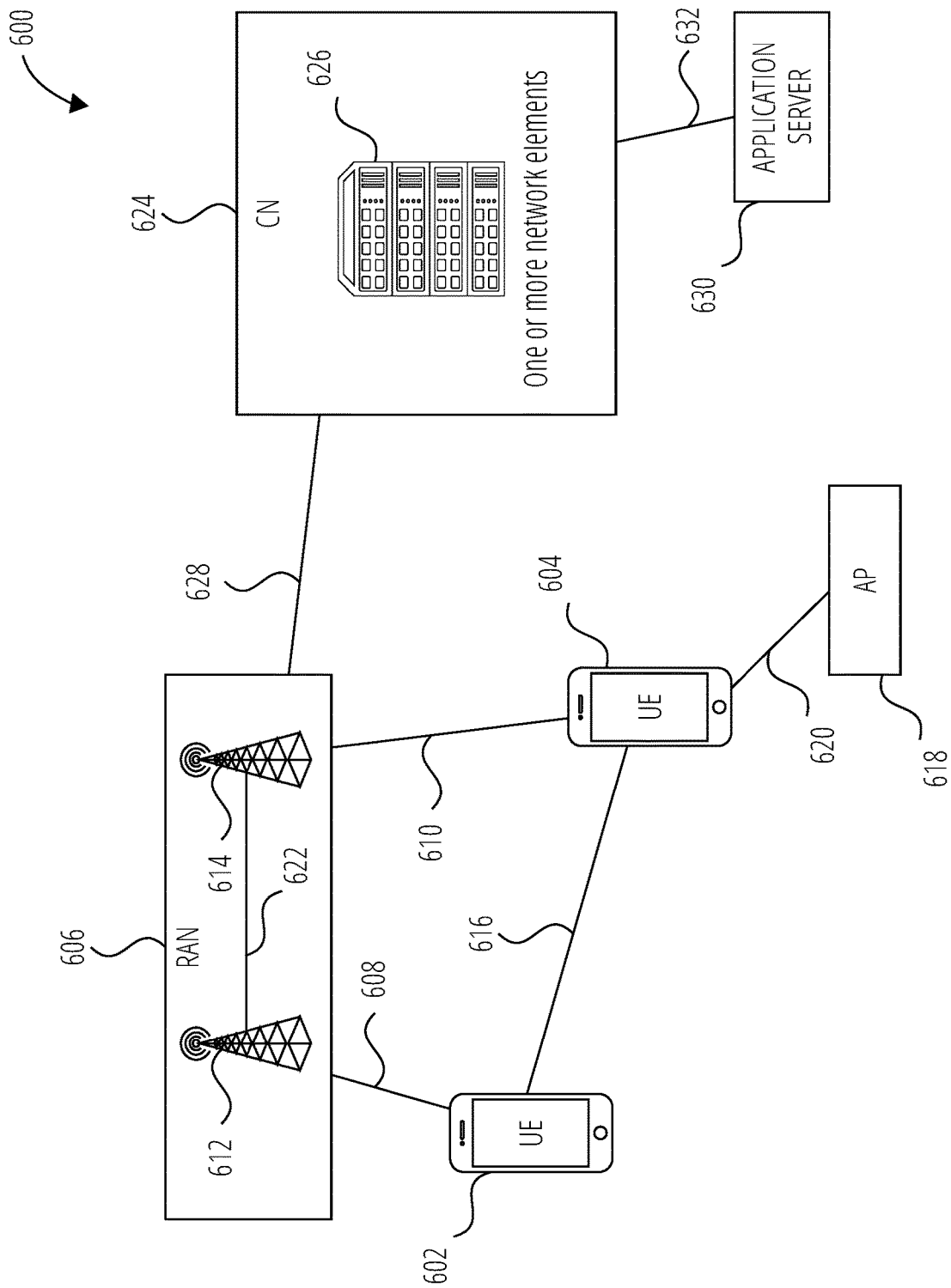
FIG. 6 illustrates an example architecture of a wireless communication system, according to embodiments disclosed herein.

FIG. 6 illustrates an example architecture of a wireless communication system 600, according to embodiments disclosed herein. The following description is provided for an example wireless communication system 600 that operates in conjunction with the LTE system standards and/or 5G or NR system standards as provided by 3GPP technical specifications.

As shown by FIG. 6, the wireless communication system 600 includes UE 602 and UE 604 (although any number of UEs may be used). In this example, the UE 602 and the UE 604 are illustrated as smartphones (e.g., handheld touchscreen mobile computing devices connectable to one or more cellular networks), but may also comprise any mobile or non-mobile computing device configured for wireless communication.

The UE 602 and UE 604 may be configured to communicatively couple with a RAN 606. In embodiments, the RAN 606 may be NG-RAN, E-UTRAN, etc. The UE 602 and UE 604 utilize connections (or channels) (shown as connection 608 and connection 610, respectively) with the RAN 606, each of which comprises a physical communications interface. The RAN 606 can include one or more base stations (such as base station 612 and base station 614) that enable the connection 608 and connection 610.

In this example, the connection 608 and connection 610 are air interfaces to enable such communicative coupling, and may be consistent with RAT(s) used by the RAN 606, such as, for example, an LTE and/or NR.

In some embodiments, the UE 602 and UE 604 may also directly exchange communication data via a sidelink interface 616. The UE 604 is shown to be configured to access an access point (shown as AP 618) via connection 620. By way of example, the connection 620 can comprise a local wireless connection, such as a connection consistent with any IEEE 802.11 protocol, wherein the AP 618 may comprise a Wi-Fi® router. In this example, the AP 618 may be connected to another network (for example, the Internet) without going through a CN 624.

In embodiments, the UE 602 and UE 604 can be configured to communicate using orthogonal frequency division multiplexing (OFDM) communication signals with each other or with the base station 612 and/or the base station 614 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 612 or base station 614 may be implemented as one or more software entities running on server computers as part of a virtual network. In addition, or in other embodiments, the base station 612 or base station 614 may be configured to communicate with one another via interface 622. In embodiments where the wireless communication system 600 is an LTE system (e.g., when the CN 624 is an EPC), the interface 622 may be an X2 interface. The X2 interface may be defined between two or more base stations (e.g., two or more eNBs and the like) that connect to an EPC, and/or between two eNBs connecting to the EPC. In embodiments where the wireless communication system 600 is an NR system (e.g., when CN 624 is a 5GC), the interface 622 may be an Xn interface. The Xn interface is defined between two or more base stations (e.g., two or more gNBs and the like) that connect to 5GC, between a base station 612 (e.g., a gNB) connecting to 5GC and an eNB, and/or between two eNBs connecting to 5GC (e.g., CN 624).

The RAN 606 is shown to be communicatively coupled to the CN 624. The CN 624 may comprise one or more network elements 626, which are configured to offer various data and telecommunications services to customers/subscribers (e.g., users of UE 602 and UE 604) who are connected to the CN 624 via the RAN 606. The components of the CN 624 may be implemented in one physical device or separate physical devices including components to read and execute instructions from a machine-readable or computer-readable medium (e.g., a non-transitory machine-readable storage medium).

In embodiments, the CN 624 may be an EPC, and the RAN 606 may be connected with the CN 624 via an S1 interface 628. In embodiments, the S1 interface 628 may be split into two parts, an S1 user plane (S1-U) interface, which carries traffic data between the base station 612 or base station 614 and a serving gateway (S-GW), and the S1-MME interface, which is a signaling interface between the base station 612 or base station 614 and mobility management entities (MMEs).

In embodiments, the CN 624 may be a 5GC, and the RAN 606 may be connected with the CN 624 via an NG interface 628. In embodiments, the NG interface 628 may be split into two parts, an NG user plane (NG-U) interface, which carries traffic data between the base station 612 or base station 614 and a user plane function (UPF), and the S1 control plane (NG-C) interface, which is a signaling interface between the base station 612 or base station 614 and access and mobility management functions (AMFs).

Generally, an application server 630 may be an element offering applications that use internet protocol (IP) bearer resources with the CN 624 (e.g., packet switched data services). The application server 630 can also be configured to support one or more communication services (e.g., VoIP sessions, group communication sessions, etc.) for the UE 602 and UE 604 via the CN 624. The application server 630 may communicate with the CN 624 through an IP communications interface 632.

Figure 7:
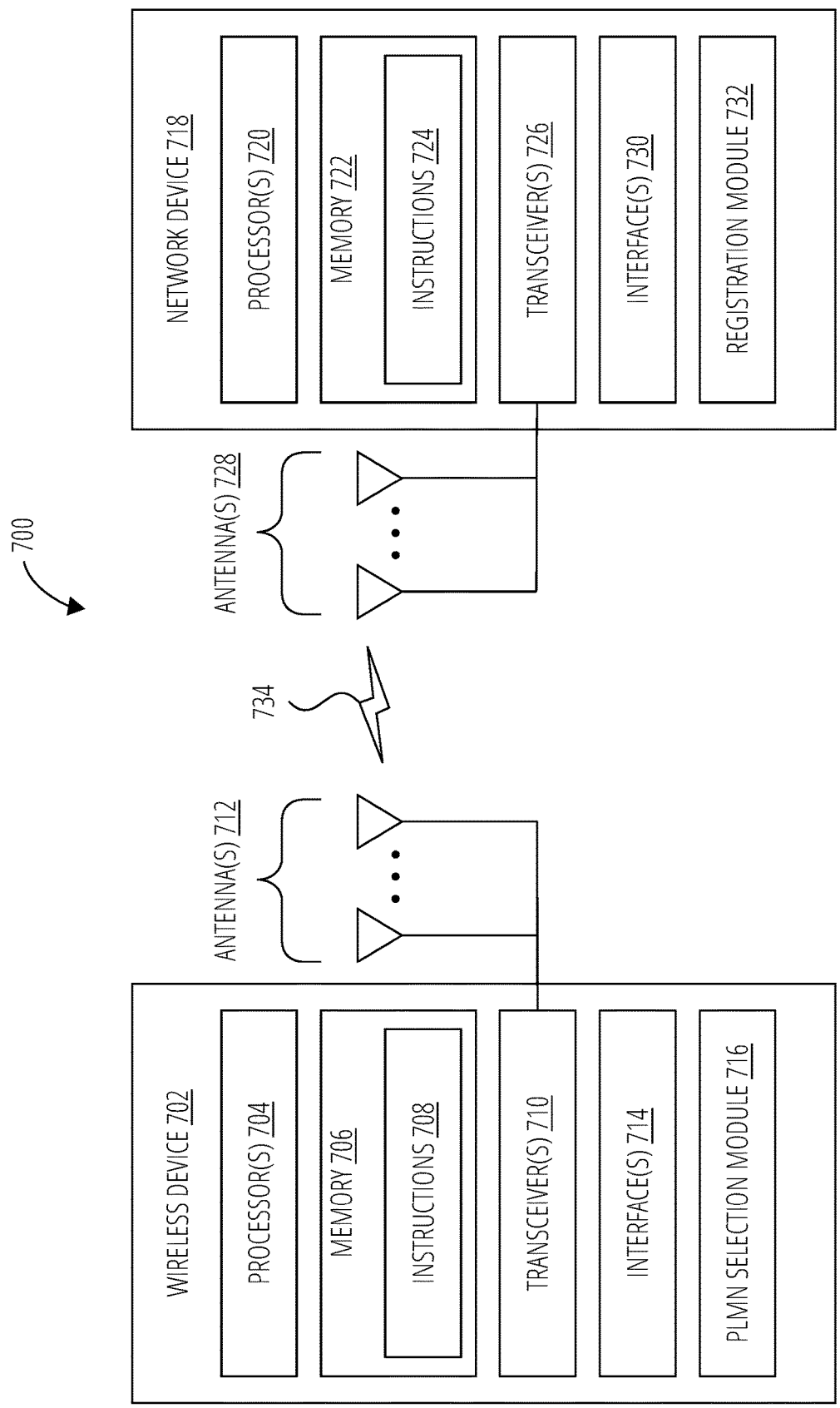
FIG. 7 illustrates a system for performing signaling between a wireless device and a network device, according to embodiments disclosed herein.

FIG. 7 illustrates a system 700 for performing signaling 734 between a wireless device 702 and a network device 718, according to embodiments disclosed herein. The system 700 may be a portion of a wireless communications system as herein described. The wireless device 702 may be, for example, a UE of a wireless communication system. The network device 718 may be, for example, a base station (e.g., an eNB or a gNB) of a wireless communication system.

The wireless device 702 may include one or more processor(s) 704. The processor(s) 704 may execute instructions such that various operations of the wireless device 702 are performed, as described herein. The processor(s) 704 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 702 may include a memory 706. The memory 706 may be a non-transitory computer-readable storage medium that stores instructions 708 (which may include, for example, the instructions being executed by the processor(s) 704). The instructions 708 may also be referred to as program code or a computer program. The memory 706 may also store data used by, and results computed by, the processor(s) 704.

The wireless device 702 may include one or more transceiver(s) 710 that may include radio frequency (RF) transmitter and/or receiver circuitry that use the antenna(s) 712 of the wireless device 702 to facilitate signaling (e.g., the signaling 734) to and/or from the wireless device 702 with other devices (e.g., the network device 718) according to corresponding RATs.

The wireless device 702 may include one or more antenna(s) 712 (e.g., one, two, four, or more). For embodiments with multiple antenna(s) 712, the wireless device 702 may leverage the spatial diversity of such multiple antenna(s) 712 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 702 may be accomplished according to precoding (or digital beamforming) that is applied at the wireless device 702 that multiplexes the data streams across the antenna(s) 712 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 702 may implement analog beamforming techniques, whereby phases of the signals sent by the antenna(s) 712 are relatively adjusted such that the (joint) transmission of the antenna(s) 712 can be directed (this is sometimes referred to as beam steering).

The wireless device 702 may include one or more interface(s) 714. The interface(s) 714 may be used to provide input to or output from the wireless device 702. For example, a wireless device 702 that is a UE may include interface(s) 714 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 710/antenna(s) 712 already described) that allow for communication between the UE and other devices and may operate according to known protocols (e.g., Wi-Fi®, Bluetooth®, and the like).

The wireless device 702 may include a PLMN selection module 716. The PLMN selection module 716 may be implemented via hardware, software, or combinations thereof. For example, the PLMN selection module 716 may be implemented as a processor, circuit, and/or instructions 708 stored in the memory 706 and executed by the processor(s) 704. In some examples, the PLMN selection module 716 may be integrated within the processor(s) 704 and/or the transceiver(s) 710. For example, the PLMN selection module 716 may be implemented by a combination of software components (e.g., executed by a DSP or a general processor) and hardware components (e.g., logic gates and circuitry) within the processor(s) 704 or the transceiver(s) 710.

The PLMN selection module 716 may be used for various aspects of the present disclosure, for example, aspects of FIG. 2, FIG. 3, and FIG. 4.

The network device 718 may include one or more processor(s) 720. The processor(s) 720 may execute instructions such that various operations of the network device 718 are performed, as described herein. The processor(s) 720 may include one or more baseband processors implemented using, for example, a CPU, a DSP, an ASIC, a controller, an FPGA device, another hardware device, a firmware device, or any combination thereof configured to perform the operations described herein.

The network device 718 may include a memory 722. The memory 722 may be a non-transitory computer-readable storage medium that stores instructions 724 (which may include, for example, the instructions being executed by the processor(s) 720). The instructions 724 may also be referred to as program code or a computer program. The memory 722 may also store data used by, and results computed by, the processor(s) 720.

The network device 718 may include one or more transceiver(s) 726 that may include RF transmitter and/or receiver circuitry that use the antenna(s) 728 of the network device 718 to facilitate signaling (e.g., the signaling 734) to and/or from the network device 718 with other devices (e.g., the wireless device 702) according to corresponding RATs.

The network device 718 may include one or more antenna(s) 728 (e.g., one, two, four, or more). In embodiments having multiple antenna(s) 728, the network device 718 may perform MIMO, digital beamforming, analog beamforming, beam steering, etc., as has been described.

The network device 718 may include one or more interface(s) 730. The interface(s) 730 may be used to provide input to or output from the network device 718. For example, a network device 718 that is a base station may include interface(s) 730 made up of transmitters, receivers, and other circuitry (e.g., other than the transceiver(s) 726/antenna(s) 728 already described) that enables the base station to communicate with other equipment in a core network, and/or that enables the base station to communicate with external networks, computers, databases, and the like for purposes of operations, administration, and maintenance of the base station or other equipment operably connected thereto.

The network device 718 may include a Registration module 732. The Registration module 732 may be implemented via hardware, software, or combinations thereof. For example, the Registration module 732 may be implemented as a processor, circuit, and/or instructions 724 stored in the memory 722 and executed by the processor(s) 720. In some examples, the Registration module 732 may be integrated within the processor(s) 720 and/or the transceiver(s) 726. For example, the Registration module 732 may be implemented by a combination of software components (e.g., executed by a DSP or a general processor) and hardware components (e.g., logic gates and circuitry) within the processor(s) 720 or the transceiver(s) 726.

The registration module 732 may be used for various aspects of the present disclosure, for example, aspects of FIG. 2, FIG. 3, and FIG. 4.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 8:
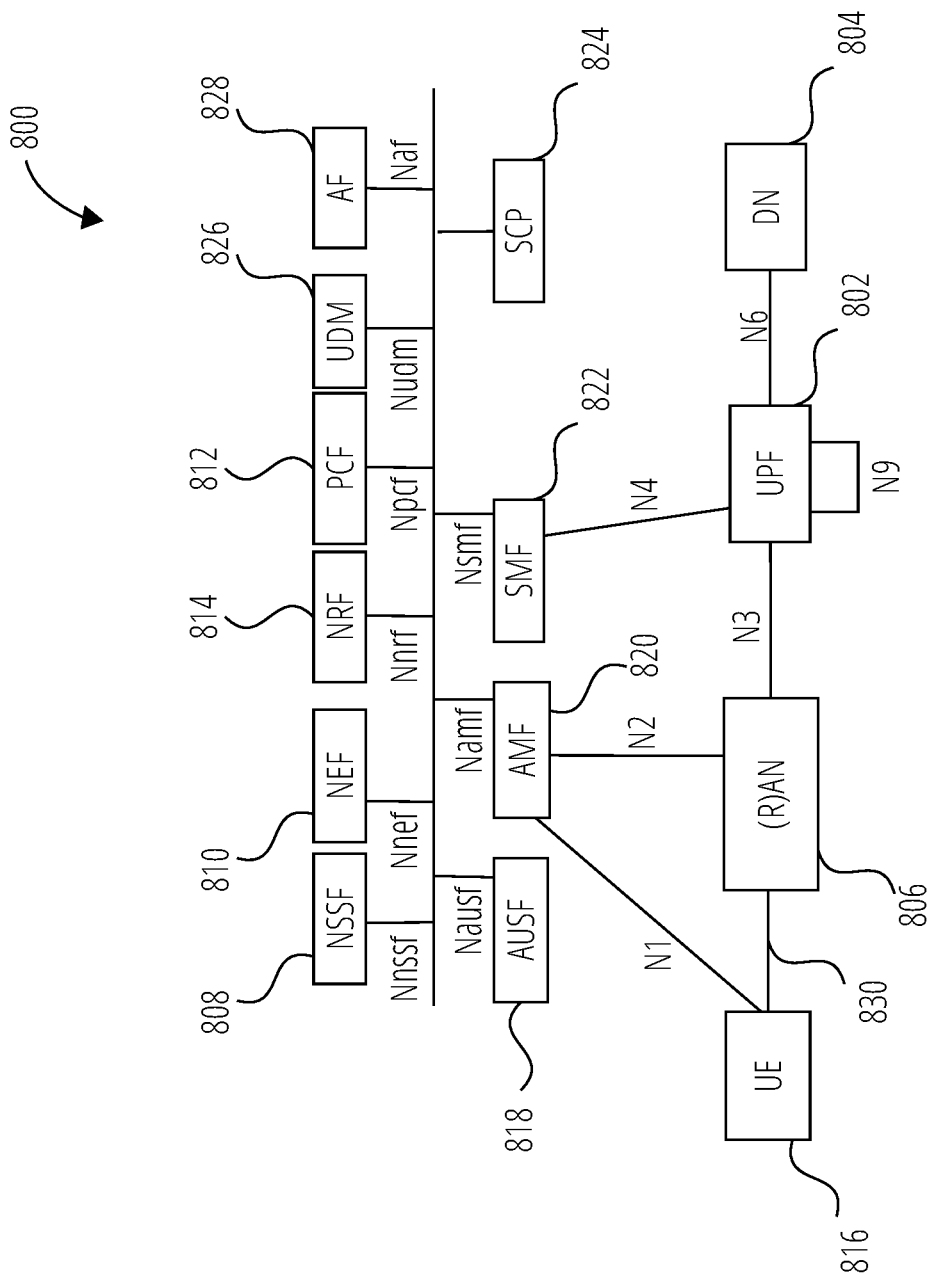
FIG. 8 illustrates an example service based architecture in accordance with certain embodiments.

FIG. 8 illustrates a service based architecture 800 in 5GS according to one embodiment. As described in 3GPP TS 23.501, the service based architecture 800 comprises NFs such as an NSSF 808, a NEF 810, an NRF 814, a PCF 812, a UDM 826, an AUSF 818, an AMF 820, an SMF 822, for communication with a UE 816, a (R)AN 806, a UPF 802, and a DN 804. The NFs and NF services can communicate directly, referred to as Direct Communication, or indirectly via a SCP 824, referred to as Indirect Communication. FIG.

8 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 8 are described below.

The NSSF 808 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 810 supports exposure of capabilities and events. NF capabilities and events may be securely exposed by the NEF 810 (e.g., for 3rd party, Application Functions, and/or Edge Computing). The NEF 810 may store/retrieve information as structured data using a standardized interface (Nudr) to a UDR. The NEF 810 may also secure provision of information from an external application to 3GPP network and may provide for the Application Functions to securely provide information to the 3GPP network (e.g., expected UE behavior, 5GLAN group information, and service specific information), wherein the NEF 810 may authenticate and authorize and assist in throttling the Application Functions (AFs). The NEF 810 may provide translation of internal-external information by translating between information exchanged with an AF 828 and information exchanged with the internal network function. For example, the NEF 810 translates between an AF-Service-Identifier and internal 5G Core information such as DNN and S-NSSAI. The NEF 810 may handle masking of network and user sensitive information to external AF's according to the network policy. The NEF 810 may receive information from other network functions (based on exposed capabilities of other network functions), and stores the received information as structured data using a standardized interface to a UDR. The stored information can be accessed and re-exposed by the NEF 810 to other network functions and Application Functions, and used for other purposes such as analytics. For external exposure of services related to specific UE(s), the NEF 810 may reside in the HPLMN. Depending on operator agreements, the NEF 810 in the HPLMN may have interface(s) with NF(s) in the VPLMN. When a UE is capable of switching between EPC and 5GC, an SCEF+NEF may be used for service exposure.

The NRF 814 supports service discovery function by receiving an NF Discovery Request from an NF instance or SCP and providing the information of the discovered NF instances to the NF instance or SCP. The NRF 814 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 812 supports a unified policy framework to govern network behavior. The PCF 812 provides policy rules to Control Plane function(s) to enforce them. The PCF 812 accesses subscription information relevant for policy decisions in a Unified Data Repository (UDR). The PCF 812 may access the UDR located in the same PLMN as the PCF.

The UDM 826 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 826 uses subscription data (including authentication data) that may be stored in a UDR, in which case a UDM implements the application logic and may not require an internal user data storage and several different UDMs may serve the same user in different transactions. The UDM 826 may be located in the HPLMN of the subscribers it serves, and may access the information of the UDR located in the same PLMN.

The AUSF 818 supports authentication for 3GPP access and untrusted non-3GPP access. The AUSF 818 may also provide support for Network Slice-Specific Authentication and Authorization.

The AMF 820 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 820. Regardless of the number of Network functions, in certain embodiments there is only one NAS interface instance per access network between the UE and the CN, terminated at one of the Network functions that implements at least NAS security and Mobility Management. The AMF 820 may also include policy related functionalities.

In addition to the functionalities described above, the AMF 820 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 822 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 822 may include policy related functionalities.

The SCP 824 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 824 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 816 may include a device with radio communication capabilities. For example, the UE 816 may comprise a smartphone (e.g., handheld touchscreen mobile computing devices connectable to one or more cellular networks). The UE 816 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 816 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 816 may be configured to connect or communicatively couple with the (R)AN 806 through a radio interface 830, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 816 and the (R)AN 806 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 806 to the UE 816 and a UL transmission may be from the UE 816 to the (R)AN 806. The UE 816 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 806 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 806 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 806) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 816 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 802 may act as an anchor point for intra-RAT and inter-RAT mobility, an external PDU session point of interconnect to the DN 804, and a branching point to support multi-homed PDU session. The UPF 802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 802 may include an uplink classifier to support routing traffic flows to a data network. The DN 804 may represent various network operator services, Internet access, or third party services. The DN 804 may include, for example, an application server.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to perform public land mobile network (PLMN) selection for disaster roaming, the method comprising:
   determining a disaster condition at a first PLMN, wherein the UE is a subscriber of the first PLMN;
   determining an availability of a second PLMN for the disaster roaming;
   selecting the second PLMN and attempting registration on the second PLMN for the disaster roaming;
   in response to attempting the registration on the second PLMN for the disaster roaming, receiving a registration reject message comprising a cause value corresponding to a registration failure for the disaster roaming on the second PLMN due to the disaster condition on the first PLMN;
   waiting for a first period of time before again attempting to register for the disaster roaming on the second PLMN for the first PLMN with the disaster condition;
   in response to the registration reject message, incrementing a disaster roaming registration failure counter;
   if the disaster roaming registration failure counter has exceeded a threshold, attempting to register on a third PLMN for the disaster roaming due to the disaster condition on the first PLMN; and
   if the disaster roaming registration failure counter has not exceeded the threshold, waiting for a second period of time before attempting to register on the second PLMN for the disaster roaming due to another disaster condition on a fourth PLMN.

2. The method of claim 1, wherein determining the availability of the second PLMN for the disaster roaming comprises:
   detecting a cell of the second PLMN that is in one of a first list of forbidden PLMNs and a second list of PLMNs with forbidden tracking areas (TAs); and
   receiving an indication from the cell that the second PLMN offers the disaster roaming for the first PLMN.

3. The method of claim 1, further comprising:
   processing an indication that the registration failure for the disaster roaming on the second PLMN comprises a permanent or persistent failure;
   in response to the permanent or persistent failure, assigning a lower priority value to the second PLMN; and
   attempting to select the third PLMN, if available, or the second PLMN for the disaster roaming based on a higher priority value for the third PLMN as compared to the lower priority value assigned to the second PLMN.

4. The method of claim 3, wherein the lower priority value assigned to the second PLMN is a lowest assignable value.

5. The method of claim 1, wherein the first period of time is according to a network based wait timer.

6. The method of claim 5, wherein the first period of time is in a range between 12 hours and 24 hours.

7. The method of claim 1, further comprising:
   adding the second PLMN to a PLMN list of where registration due to the disaster roaming has failed; and
   waiting for the second period of time before attempting to register on PLMNs in the list for the disaster roaming for the fourth PLMN.

8. The method of claim 1, wherein the second period of time is according to an implementation specific wait time.

9. The method of claim 8, wherein the second period of time is in a range between 3 minutes and 10 minutes.

10. The method of claim 1, further comprising:
    incrementing the disaster roaming registration failure counter for each disaster roaming registration failure;
    computing a series of time windows for attempting the registration, wherein the series of time windows are regulated by an initial start time; and
    staggering subsequent registration attempts during the series of time windows subject to an additional offset time that is scaled upward according to the disaster roaming registration failure counter.

11. The method of claim 1, further comprising:
    incrementing the disaster roaming registration failure counter for each disaster roaming registration failure;
    using a hash of an international mobile subscriber identity (IMSI) and a random number or a pseudorandom number to generate a disaster roaming wait range; and
    staggering subsequent registration attempts by scaling up the disaster roaming wait range based on a non-zero value of the disaster roaming registration failure counter.

12. The method of claim 1, further comprising:
    incrementing the disaster roaming registration failure counter for each disaster roaming registration failure; and
    staggering subsequent registration attempts by scaling up a minimum wait time based on a non-zero value of the disaster roaming registration failure counter.

13. A baseband processor for a wireless device, the baseband processor configured to:
    determine a disaster condition at a first public land mobile network (PLMN), wherein the wireless device is a subscriber of the first PLMN;
    determine an availability of a second PLMN for disaster roaming;

select the second PLMN and attempting registration on the second PLMN for the disaster roaming;

in response to attempting the registration on the second PLMN for the disaster roaming, process a registration reject message comprising a cause value corresponding to a registration failure for the disaster roaming on the second PLMN due to the disaster condition on the first PLMN;

wait for a first period of time before again attempting to register for the disaster roaming on the second PLMN for the first PLMN with the disaster condition;

in response to the registration reject message, increment a disaster roaming registration failure counter;

if the disaster roaming registration failure counter has exceeded a threshold, attempt to register on a third PLMN for the disaster roaming due to the disaster condition on the first PLMN; and if the disaster roaming registration failure counter has not exceeded the threshold, wait for a second period of time before attempting to register on the second PLMN for the disaster roaming due to another disaster condition on a fourth PLMN.

14. The baseband processor of claim 13, wherein to determine the availability of the second PLMN for the disaster roaming comprises to:

detect a cell of the second PLMN that is in one of a first list of forbidden PLMNs and a second list of PLMNs with forbidden tracking areas (TAs); and process an indication from the cell that the second PLMN offers the disaster roaming for the first PLMN.

15. The baseband processor of claim 13, further configured to:

add the second PLMN to a PLMN list of where registration due to the disaster roaming has failed; and wait for the second period of time before attempting to register on PLMNs in the list for the disaster roaming for the fourth PLMN.

16. The baseband processor of claim 13, wherein the second period of time is according to an implementation specific wait time.

17. The baseband processor of claim 16, wherein the second period of time is in a range between 3 minutes and 10 minutes.

18. The baseband processor of claim 13, further configured to:

increment the disaster roaming registration failure counter for each disaster roaming registration failure;

compute a series of time windows for attempting the registration, wherein the series of time windows are regulated by an initial start time; and stagger subsequent registration attempts during the series of time windows subject to an additional offset time that is scaled upward according to the disaster roaming registration failure counter.

19. The baseband processor of claim 13, further configured to:

increment the disaster roaming registration failure counter for each disaster roaming registration failure;

use a hash of an international mobile subscriber identity (IMSI) and a random number or a pseudorandom number to generate a disaster roaming wait range; and stagger subsequent registration attempts by scaling up the disaster roaming wait range based on a non-zero value of the disaster roaming registration failure counter.

20. The baseband processor of claim 13, further configured to:

increment the disaster roaming registration failure counter for each disaster roaming registration failure; and stagger subsequent registration attempts by scaling up a minimum wait time based on a non-zero value of the disaster roaming registration failure counter.

\* \* \* \* \*